United States Patent
Ginsberg

(10) Patent No.: US 9,472,909 B2
(45) Date of Patent: Oct. 18, 2016

(54) MOBILE DEVICE CASE WITH RETRACTABLE CABLE

(71) Applicant: Ezra J. Ginsberg, Brooklyn, NY (US)

(72) Inventor: Ezra J. Ginsberg, Brooklyn, NY (US)

( * ) Notice: Subject to any disclaimer, the term of this patent is extended or adjusted under 35 U.S.C. 154(b) by 153 days.

(21) Appl. No.: 14/448,839

(22) Filed: Jul. 31, 2014

(65) Prior Publication Data

US 2015/0364875 A1    Dec. 17, 2015

Related U.S. Application Data

(60) Provisional application No. 62/011,771, filed on Jun. 13, 2014.

(51) Int. Cl.
*H02J 7/00* (2006.01)
*H01R 13/72* (2006.01)

(52) U.S. Cl.
CPC ............ *H01R 13/72* (2013.01); *H02J 7/0044* (2013.01); *H02J 7/0052* (2013.01); *H02J 2007/0062* (2013.01)

(58) Field of Classification Search
CPC ........... H02J 7/0044; H02J 2007/0062; H02J 7/0052; H01R 11/01; H01R 13/72; H04M 1/04
See application file for complete search history.

(56) References Cited

U.S. PATENT DOCUMENTS

| | | | |
|---|---|---|---|
| 8,390,255 B1 * | 3/2013 | Fathollahi | H02J 7/0045 206/308.3 |
| 8,403,247 B2 | 3/2013 | Chen | |
| 2008/0053770 A1 | 3/2008 | Tynyk | |
| 2011/0233078 A1 * | 9/2011 | Monaco | A45C 11/00 206/223 |
| 2013/0020425 A1 | 1/2013 | Grassi | |
| 2013/0242478 A1 * | 9/2013 | Song | H05K 5/0239 361/679.01 |
| 2013/0270002 A1 * | 10/2013 | Fawcett | H01R 11/01 174/84 S |
| 2013/0320913 A1 * | 12/2013 | Chen | H02J 7/0042 320/103 |
| 2014/0174846 A1 * | 6/2014 | Molinaro | G10K 11/08 181/177 |
| 2015/0028797 A1 * | 1/2015 | Miller | H02J 7/0042 320/103 |
| 2015/0148100 A1 * | 5/2015 | Malenotti | H04M 1/0254 455/557 |
| 2015/0156297 A1 * | 6/2015 | Crawford | H04B 5/0037 455/26.1 |

FOREIGN PATENT DOCUMENTS

WO    2013165878    11/2013

* cited by examiner

*Primary Examiner* — Vuthe Siek
(74) *Attorney, Agent, or Firm* — Kirschstein, Israel, Schiffmiller & Pieroni, P.C.

(57) ABSTRACT

A mobile device case is generally described. In some examples, the mobile device case may include a retracting mechanism. In some examples, the retracting mechanism may be coupled to a cable. The cable may be effective to allow the cable to be extended away from the mobile device case, lock the cable into place at a length of extension, and retract the cable into the mobile device case. In some examples, the cable may be electrically coupled to a connector piece formed within the mobile device case. In various examples, the cable may be effective to provide power or sync data to a mobile device installed within the mobile device case.

13 Claims, 5 Drawing Sheets

MOBILE DEVICE CASE WITH RETRACTABLE CABLE

CROSS REFERENCE TO RELATED APPLICATIONS

This application claims priority under 35 U.S.C. §119(e) to U.S. Provisional Application 62/011,771 filed on Jun. 13, 2014, the entirety of which is hereby incorporated by reference.

BACKGROUND

Unless otherwise indicated herein, the materials described in this section are not prior art to the claims in this application and are not admitted to be prior art by inclusion in this section.

Mobile devices may include cell phones, smart phones, personal digital assistants ("PDAs"), tablets, and/or other portable devices. Mobile device cases may be designed to protect a mobile device from damage. Mobile device cases may surround the mobile device and may be designed so that functionality of the mobile device is not impeded.

SUMMARY OF THE INVENTION

In some examples, a mobile device case is generally described. The mobile device case may include a top portion, a bottom portion, and side portions arranged to define a void. In some examples, the void may be sized and shaped so as to be effective to receive a mobile device. In some further examples, the mobile device case may include a rear portion arranged between the top portion, the bottom portion and the side portions. The rear portion may include one or more walls arranged to define a compartment in the mobile device case. In various examples, the mobile device case may include a connector piece. The connector piece may be electrically coupled to a cable. In some examples, the connector piece may be effective to connect to a port of the mobile device. In some further examples, the mobile device may include a retracting mechanism inside the compartment. The retracting mechanism may be effective to allow the cable to be extended away from the mobile device case. In some further examples, the retracting mechanism may be further effective to lock the cable into place at a length of extension. In some examples, the retracting mechanism may be further effective to retract the cable into the mobile device case.

In some examples, methods to charge a battery of a mobile device are generally described. The methods may include connecting the mobile device to a connector piece in a mobile device case. In some examples, the connector piece may be electrically coupled to a cable. The methods may further include extending at least a portion of the cable away from the mobile device case through an opening defined by one or more walls in the mobile device case. In various examples, the methods may further include connecting the cable to a power source or computing device. In some examples, the methods may further include charging the battery of the mobile device through the cable. In some other examples, the methods may further include retracting the cable through the opening into the mobile device case using a retracting mechanism.

In some examples, methods of retracting a cable into a compartment of a mobile device case are generally described. In some examples, the methods may include extending a cable away from a mobile device case through an opening defined by one or more walls in the mobile device case, until a desired length of the cable has been extended away. In various other examples, the methods may further include locking a retracting mechanism. The retracting mechanism may be at a locked position when locked. The methods may further include pulling the cable beyond the locked position. In some examples, the methods may further include retracting the cable into the mobile device case through the opening.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION

Figure 1:
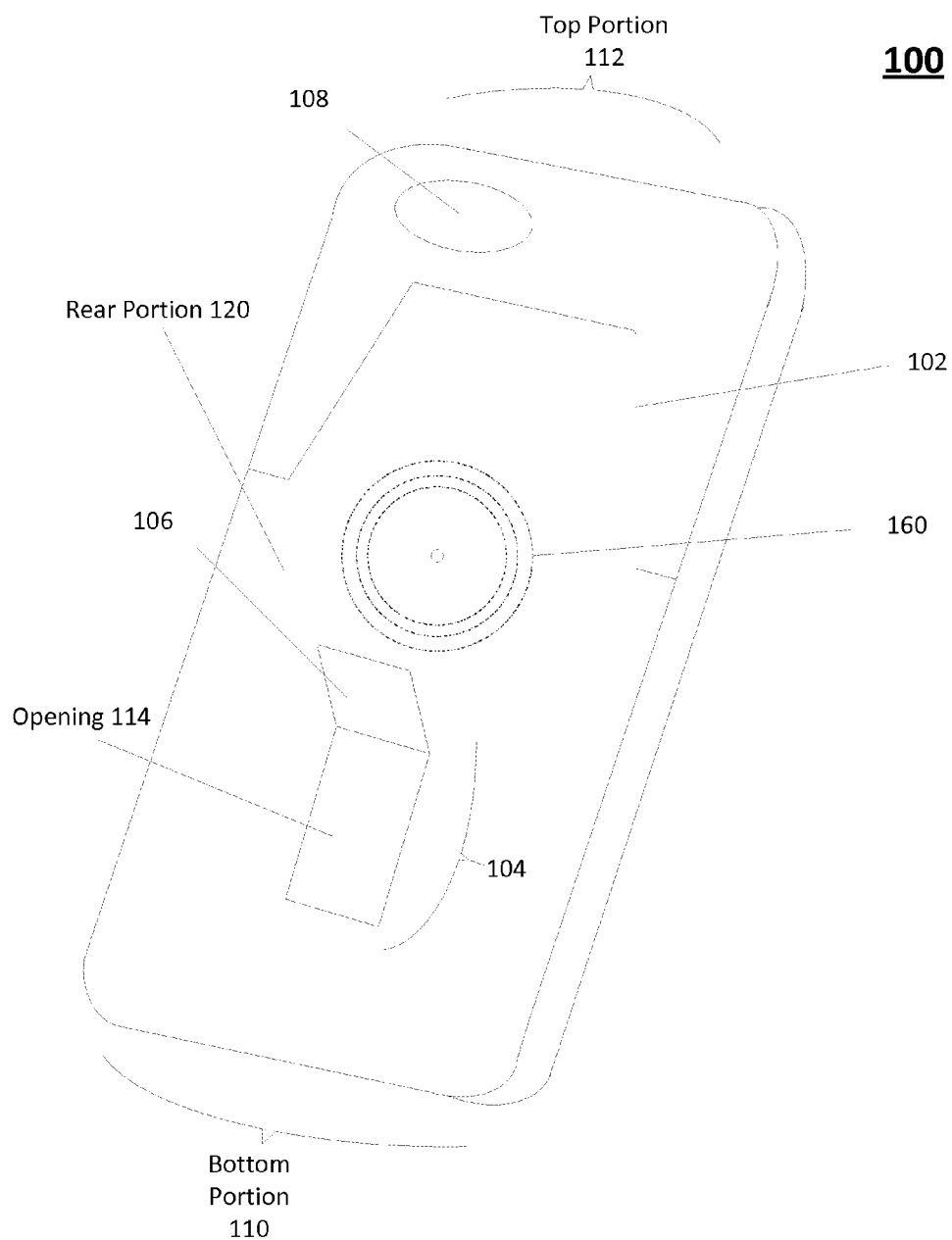
FIG. 1 illustrates a rear view of an example mobile device case, in accordance with an embodiment of the invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and devices, related to a mobile device case with retractable cable.

FIG. 1 illustrates a rear view of an example mobile device case 100. Mobile device case 100 may include a top portion 112, bottom portion 110, and side portions. In some examples, top portion 112, bottom portion 110, and side portions of mobile device case 100 may be arranged to define a void. The void may be sized and/or shaped so as to be effective to receive a mobile device. In some examples, mobile device case 100 may be designed to hold and/or secure a received mobile device. In some examples, mobile device case 100 may be configured to separate into top portion of device case 112 and bottom portion of device case 110 to allow for a mobile device to be installed in the case.

For example, mobile device case 100 may separate into top portion of device case 112 and bottom portion of device case 110 along a seem 102, to allow for installation of a mobile device. In various other examples, mobile device case 100 may be effective to stretch and/or bend to securely fit around a mobile device.

In some examples, mobile device case 100 may include walls that define an open portion 108 to allow for a camera of a mobile device to capture images while the mobile device is installed in mobile device case 100. Additionally, walls of mobile device case 100 may be formed in such a way as to define one or more openings to allow a mobile device installed within mobile device case 100 to connect with cables, wires, and/or other connectors through the openings. For example, walls of mobile device case 100 may be formed in such a way as to allow access to a headphone port on a mobile device installed within mobile device case 100. The size, shape, and position of various openings of mobile device case 100 may vary according to the particular mobile device for which mobile device case 100 is designed. In some examples, mobile device case 100 may include openings and/or molded portions effective to allow buttons of a mobile device installed within mobile device case 100 to be depressed.

Mobile device case 100 may include one or more walls which may define a compartment 104. In an example, a rear portion 120 of mobile device case 100 may be situated between top portion 112, bottom portion 110, and side portions of mobile device case 100. One or more walls of rear portion 120 may be arranged to define a compartment 104 inside mobile device case 100. A cover 106 may be a door, lid or other covering which may be configured to at least partially conceal and/or cover an opening 114 or access point to compartment 104. In some examples, opening 114 may be defined by one or more walls of rear portion 120 of mobile device case 100. Although cover 106 is depicted in FIG. 1 as a hinged door, cover 106 may use any mechanism to cover the opening to compartment 104. For example, cover 106 may be configured to slide in a plane parallel to the rear surface of mobile device case 100 in order to cover opening 114. Compartment 106 may include a retracting mechanism 160. In some examples, retracting mechanism 160 may include a spool, wheel or other track effective to retract a cable into compartment 104 through opening 114.

Figure 2:
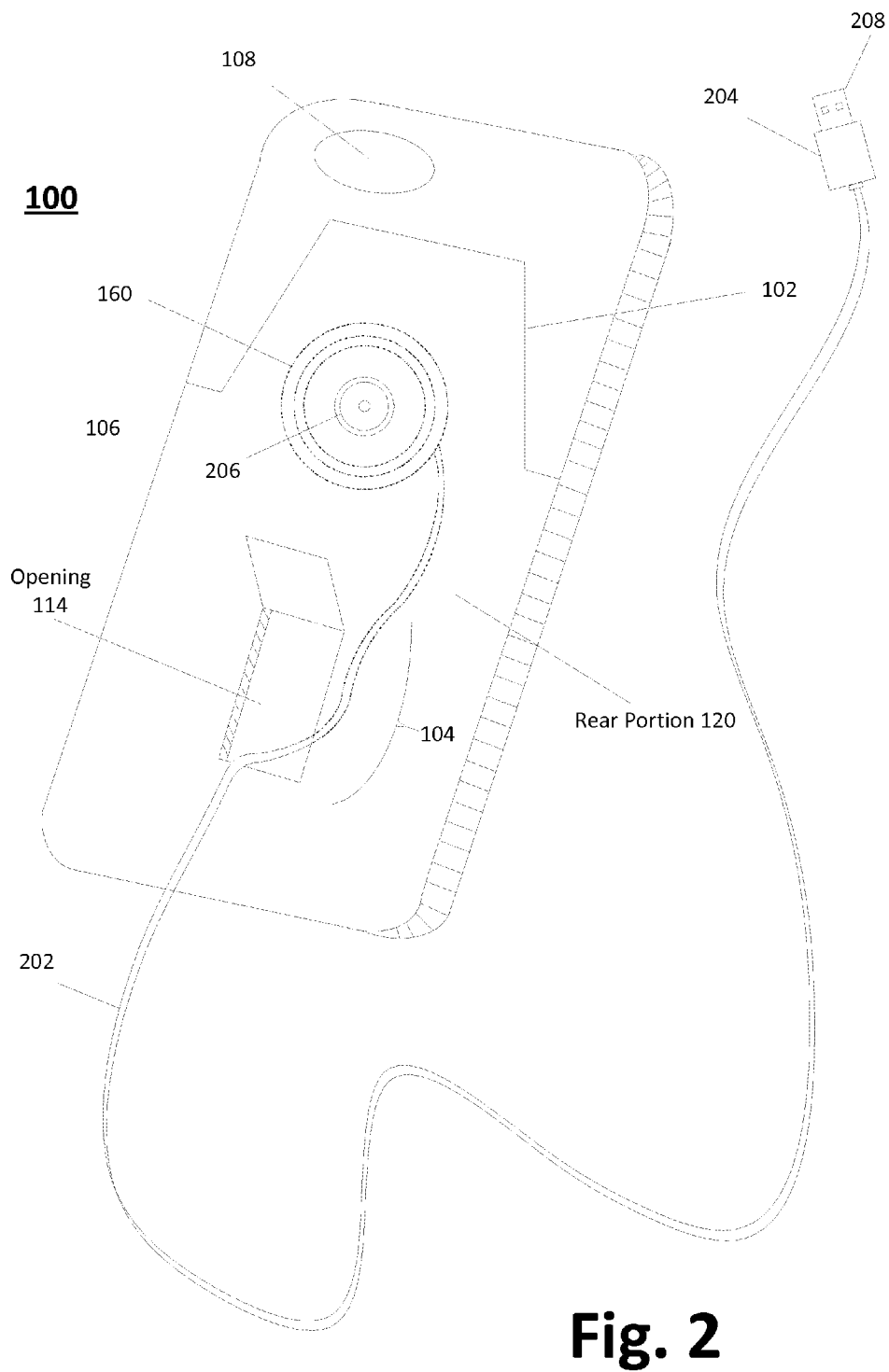
FIG. 2 illustrates a rear view of an example mobile device case including a retractable cable, in accordance with an embodiment of the invention.

FIG. 2 illustrates a rear view of mobile device case 100, in accordance with an embodiment of the invention. Opening 114 may be configured such that a cable 202 may be removed through opening 114. In some examples, cable 202 may be retractable. In some other examples, cable 202 may be a universal serial bus ("USB") cable. Cable 202 may be effective to provide power to a battery of mobile device case 100 and/or to a mobile device installed in mobile device case 100. In another example, cable 202 may be effective to transmit data.

Cable 202 may include a distal head 204 and a proximal head 206. In some examples, distal head 204 may include a connector piece 208. Distal head 204 and/or connector piece 208 of cable 202 may be extended away from mobile device case 100 and connected or coupled to ports, outlets, and/or other coupling points external to the mobile device case. Cable 202 (including distal head 204) may be retracted into compartment 104. For example, cable 202 may be retracted by a spring operated mechanism. Proximal head 206 of cable 202 may be connected to a portion of mobile device case 100. For example, proximal head 206 may be electrically coupled to retracting mechanism 160 such that retracting mechanism 160 may be effective to rotate while coupled to proximal head 206. Proximal head 206 may be coupled to a charging/syncing connector piece, as will be discussed in further detail below. Distal head 204 and cable 202 may be retracted into compartment 104 through opening 114 so that distal head 204 and cable 202 are in a retracted state within compartment 104. While in a retracted state, a surface of distal head 204 may be flush and/or in a plane with the rear surface of mobile device case 100. Cover 106 may be effective to cover distal head 204 and cable 202, when distal head 204 and cable 202 are in a retracted state. In some examples, cover 106 (when closed) may prevent distal head 204 and cable 202 from falling out of mobile device case 100. In some examples, cover 106 may cover or conceal connector piece 208 while distal head 204 is arranged in a recessed portion of rear portion 120. Distal head 204 may be flush and/or in a plane with the rear surface of mobile device case 100 while arranged in a recessed portion of a surface of rear portion 120.

Figure 3:
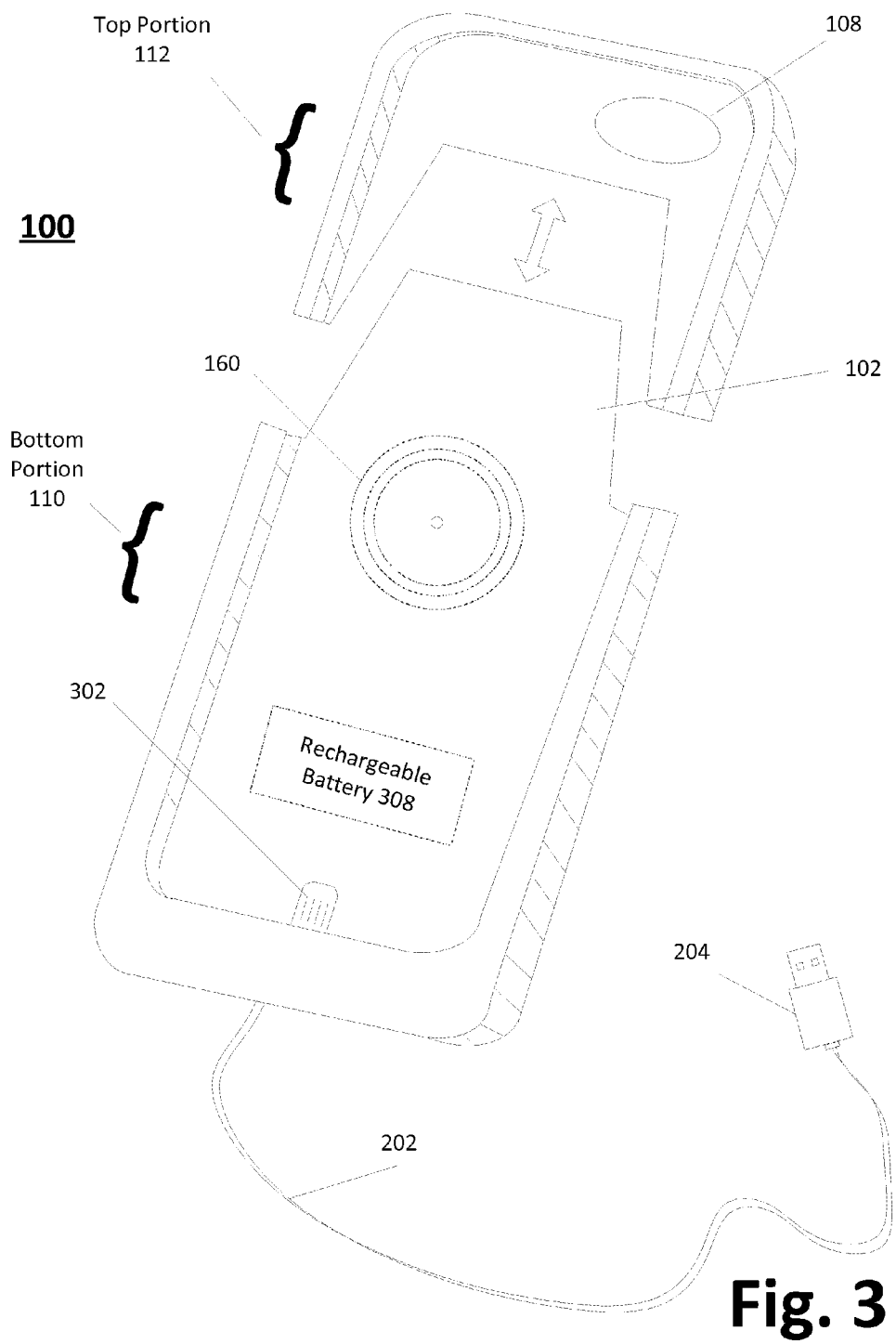
FIG. 3 illustrates a front view of an example mobile device case, separated into a top portion of the mobile device case and a bottom portion of the mobile device case, in accordance with an embodiment of the invention.

FIG. 3 illustrates a front view of mobile device case 100, in accordance with an embodiment of the invention. Mobile device case 100 may be separated along seem 102 into top portion of device case 112 and bottom portion of device case 110. Mobile device case 100 may include a charging/syncing connector piece 302. In an example, bottom portion 110 may include charging/syncing connector piece 302. Charging/syncing connector piece 302 may connect or electrically couple to a port of a mobile device when the mobile device is installed within mobile device case 100. Charging/syncing connector piece 302 may be electrically coupled to proximal head 206 of cable 202 within mobile device case 100. For example, proximal head 206 may be effective to couple to charging/syncing connector piece 302 such that retracting mechanism 160 may rotate without interrupting an electrical coupling between proximal head 206 and charging/syncing connector piece 302. In one example, the coupling between proximal head 206 and charging syncing connector piece 302 may include one or more tension bent connectors arranged in contact with circular conductors disposed on a surface of retracting mechanism 160. In some examples, charging/syncing connector piece 302 may be formed as a part of mobile device case 100. In other examples, charging/syncing connector piece 302 may be fused or connected to a portion of mobile device case 100, such as bottom portion 110. Charging/syncing connector piece 302 may be effective to charge a battery of a mobile device when the mobile device is installed within mobile device case 100. In some examples, charging/syncing connector piece 302 may be effective to sync data between a mobile device installed within mobile device case 100 and an external device. In some examples, an external computing device may be connected or coupled to mobile device case 100 through distal head 204 and/or connector piece 208 of cable 202.

In various examples, mobile device case 100 may include a rechargeable battery 308. In some examples, rechargeable battery 308 may be formed within mobile device case 100 or connected to mobile device case 100. Rechargeable battery 308 may be a battery effective to charge a battery of a mobile device installed within mobile device case 100. In some examples, rechargeable battery 308 may be effective to recharge a battery of a mobile device installed within mobile device case 100 through charging/syncing connector piece 302. In some examples, rechargeable battery 308 may be charged through cable 202. In various examples, when distal head 204 and/or connector piece 208 of cable 202 is coupled to a power source, a battery of a mobile device installed within mobile device case 100 may be charged through charging/syncing connector piece 302. When the battery of the mobile device installed within mobile device case 100 is fully charged, rechargeable battery 308 may be charged through cable 202. In various other examples where cable 202 is coupled to a power source, rechargeable battery 308 may be charged prior to charging a battery of a mobile device installed within mobile device case 100.

Figure 4:
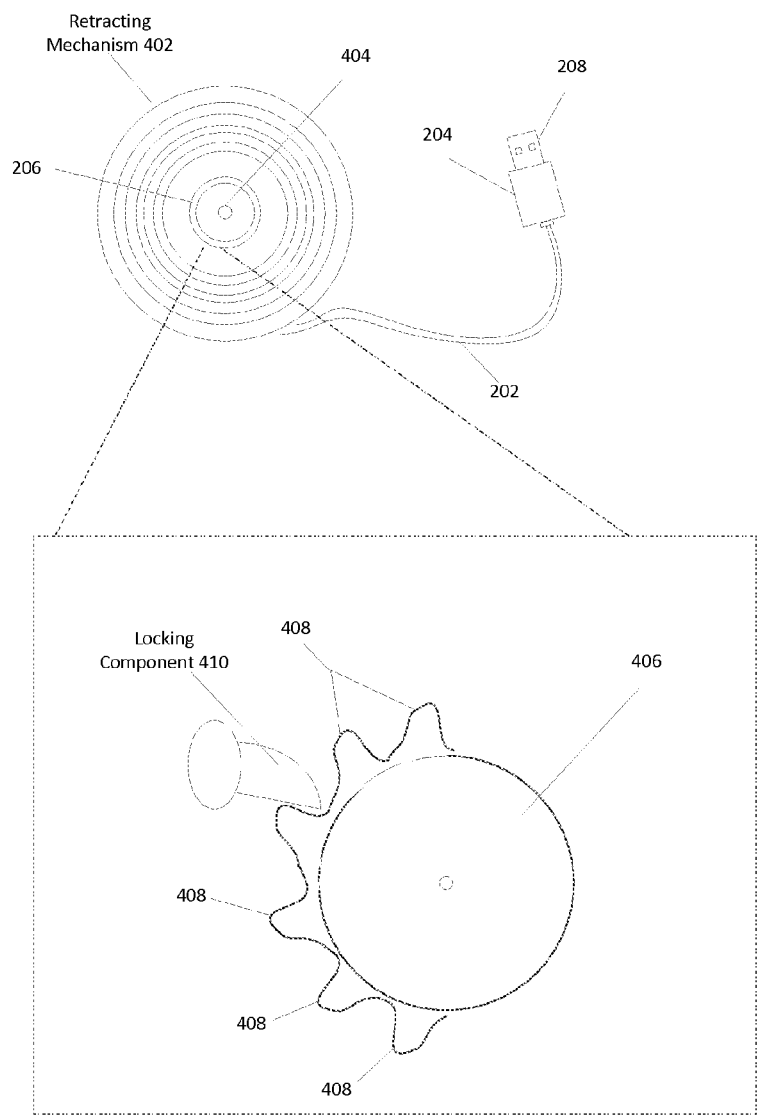
FIG. 4 illustrates a retracting mechanism, in accordance with an embodiment of the invention.

FIG. 4 illustrates an example of retracting mechanism 160, in accordance with an embodiment of the invention. In some examples, compartment 104 of mobile device case 100 may include a retracting mechanism 160. For example, retracting mechanism 160 may be connected or fused to one or more walls which define compartment 104. In some examples, retracting mechanism 160 may include a spool, wheel or other track effective to retract cable 202. For example, cable 202 may be at least partially wound around retracting mechanism 160. Retracting mechanism 160 may allow cable 202 to be unwound from retracting mechanism 160 when cable 202 is pulled or extended away from mobile device case 100 through opening 114. In examples where retracting mechanism 160 is a wheel-like structure, retracting mechanism 160 may be configured to rotate around an axle 404. In some examples, retracting mechanism 160 may use a locking spring mechanism or other tension based mechanism. For example, a desired length of cable 202 may be extended away from mobile device case 100. When a desired length of cable 202 has been extended away from mobile device case 100, retracting mechanism 160 may be locked into place. For example, retracting mechanism 160 may be effective to lock into place when a user stops pulling cable 202 out of mobile device case 100. When retracting mechanism 160 is locked into place, cable 202 may be locked into place at a particular length of extension.

A user of mobile device case 100 may unlock retracting mechanism 160 by pulling cable 202 beyond the locked position and releasing the tension caused by pulling the cable beyond the locked position. In some examples, a spring or tension mechanism may be effective to retract cable 202 into compartment 104 of mobile device case 100 for storage and/or concealment. For example, after retracting cable 202 into compartment 104, cable 202 may be fully disposed within compartment 104 of mobile device case 100.

In some cases, retracting mechanism 160 may include a cogged wheel 406, which may include cogs and/or teeth 408 around less than the entire circumference of cogged wheel 406. In various examples, cogged wheel 406 may be located around axle 404. A locking component 410 may engage with cogs 408 to lock cogged wheel 406 (and thus retracting mechanism 160 and cable 202) into place. Cogged wheel 406, in combination with the coiled spring (or other tension mechanism) may allow retracting mechanism 160 (and thus cable 202) to be locked into a desired position. In some examples, a button may be used to lock cable 202 into place at a desired length of extension. Additionally, a button may be used to retract cable 202, when cable 202 is extended away from mobile device case 100.

Among other possible benefits, a mobile device case in accordance with the present disclosure may allow a mobile device user to have a charging/syncing cable at the user's disposal, while securely protecting the mobile device inside a case. Additionally, the retractable mechanism may allow a charging/syncing cable to be secured within the mobile device case when the cable is not in use. The charging/syncing cable may be configured to sync data to and/or charge the battery of the mobile device as well as additional rechargeable batteries which may be installed within the mobile device case. Additionally, a user may be able to continue to use the mobile device while the USB cable may be connected to an external port, as the USB cable may be of a length which may be in excess of a few inches.

Figure 5:
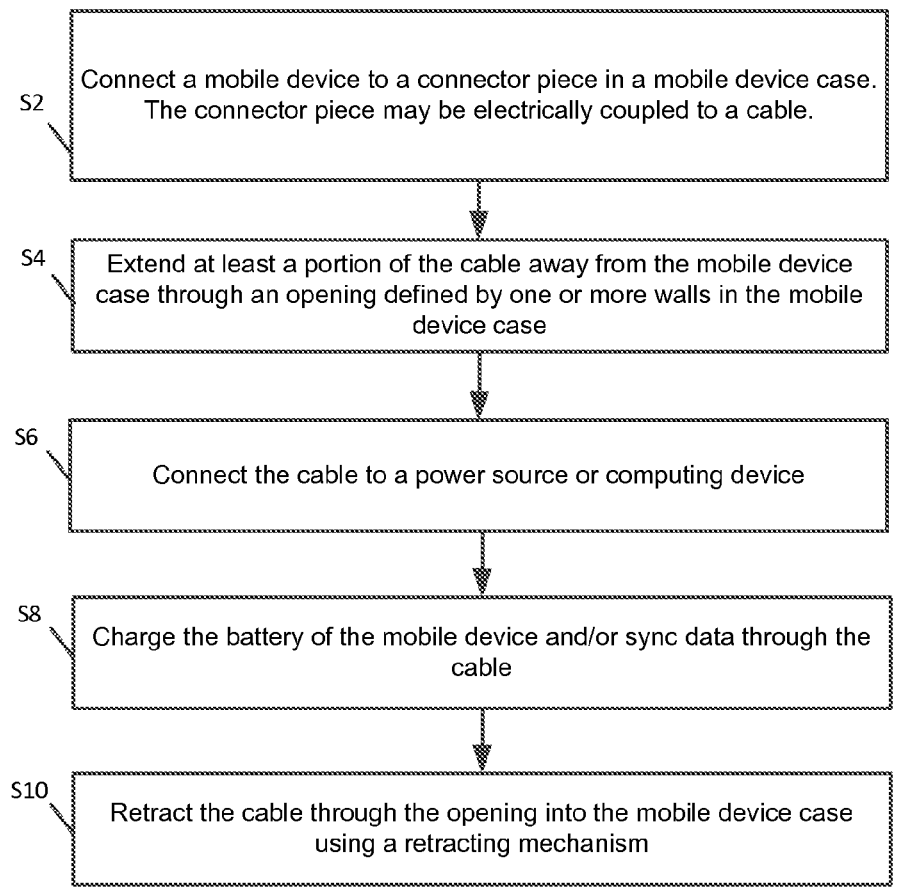
FIG. 5 illustrating a flow diagram for an example process to implement a mobile device case with retractable cable, in accordance with some embodiments of the invention.

FIG. 5 depicts a flow diagram for example processes to implement a mobile device case with retractable cable arranged in accordance with at least some examples described herein. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation. The blocks may be supplemented with additional blocks representing other operations, actions or functions. The process in FIG. 5 may be used by a mobile device case with retractable cable. The mobile device case with retractable cable may be configured in communication with a mobile device.

Processing may begin at block S2, "Connect a mobile device to a connector piece in a mobile device case. The connector piece may be electrically coupled to a cable." At block S2, a mobile device may be connected to a connecter piece in a mobile device case. The connector piece may be electrically coupled to a cable, such as cable 202 depicted in FIG. 2. In some examples, the cable may include a distal head and a proximal head. The proximal head may be electrically coupled to a connector piece of the mobile device case. In some examples, the proximal head may be connected to a portion of the mobile device case.

Processing may continue from block S2 to block S4, "Extend at least a portion of the cable away from the mobile device case through an opening defined by one or more walls in the mobile device case." At block S4, the cable, such as cable 202, may be extended away from the mobile device case through an opening (such as opening 114 of FIG. 1) defined by one or more walls in the mobile device case.

Processing may continue from block S4 to block S6, "Connect the cable to a power source or computing device." At block S6, the cable may be connected to a power source.

Processing may continue from block S6 to block S8, "Charge the battery of the mobile device and/or sync data through the cable." At block S8, a battery of a mobile device installed within the mobile device case may be charged through the cable. In some other examples, the cable may be connected to a computing device. Data may be synced between the mobile device installed within the mobile device case and the computing device.

Processing may continue from block S8 to block S10, "Retract the cable through the opening into the mobile device case using a retracting mechanism." At block S10 the cable (such as cable 202) may be retracted through the opening into the mobile device case using a retracting mechanism (such as retracting mechanism 402 of FIG. 4). In some examples, the retracting mechanism may include a spool or a wheel. In some other examples, retracting the cable may include using a locking spring mechanism to rotate the retracting mechanism around an axle. In some further examples, after retracting the cable, the cable or a portion of the cable may be concealed using a cover. In various examples, concealing the cable may include sliding the cover over the opening in a plane that is parallel to the rear surface of the mobile device case.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A case for a mobile device that is powered by an internal rechargeable battery that is operatively connected to a power/data port on the mobile device, the case comprising:
   a plurality of walls hounding a cavity for receiving the mobile device in a mounted position, one of the walls being a rear wall;
   a cover wall juxtaposed with the rear wall and hounding an internal compartment therewith, the cover wall having an opening;
   a power/data connector fixed to the case and connected to the power/data port in the mounted position;
   an elongated Universal Serial Bus (USB) cable having one end inside the internal compartment, and an opposite end operatively connected to a USB connector; and
   a cable extension/retraction mechanism mounted in the internal compartment and operatively connected between said one end of the USB cable and the power/data connector, the mechanism being operative for enabling the USB cable to be extended in one direction through the opening to an extended state for connection of the USB connector to an electrical power source for recharging the internal rechargeable battery, and for enabling the USB cable to be retracted in an opposite direction through the opening to a retracted state for storage inside the internal compartment.

2. The case of claim 1, wherein the plurality of walls include a top case portion and a bottom case portion that is separable from the top case portion.

3. The case of claim 1, and a door mounted on the cover wall for covering the opening in the retracted state, and for uncovering the opening in the extended state.

4. The case of claim 1, wherein the USB connector is received in the internal compartment in the retracted state.

5. The case of claim 1, wherein the mechanism includes a rotary spool around which the USB cable is wound in the retracted state, and unwound in the extended state.

6. The case of claim 1, and further comprising a lock for releasably locking the USB cable in the extended state.

7. The case of claim 1, and further comprising a backup battery mounted in the internal compartment, and wherein the USB cable in the extended state conducts electrical power to at least one of the batteries.

8. A method of electrically charging an internal rechargeable battery of a mobile device via a power/data port on the mobile device, the method comprising:
   receiving the mobile device in a cavity of a case having a plurality of walls in a mounted position;
   juxtaposing a cover wall with a rear wall of the case to bound an internal compartment therewith;
   fixedly mounting a power/data connector to the case;
   connecting the power/data connector to the power/data port in the mounted position;
   mounting one end of an elongated Universal Serial Bus (USB) cable inside the internal compartment, and operatively connecting an opposite end of the USB cable to a USB connector;
   operatively connecting a cable extension/retraction mechanism between said one end of the USB cable and the power/data connector;
   extending the USB cable from the cable extension/retraction mechanism mounted in the internal compartment to an extended state;
   connecting the USB connector in the extended state to an electrical power source for recharging the internal rechargeable battery; and
   retracting the USB cable to the cable extension/retraction mechanism to a retracted state for storage inside the internal compartment.

9. The method of claim 8, and winding the USB cable around a rotary spool in the retracted state, and unwinding the USB cable from the spool in the extended state.

10. The method of claim 8, and releasably locking the USB cable in the extended state.

11. The method of claim 8, and mounting a backup battery in the internal compartment, and conducting electrical power to at least one of the batteries with the USB cable in the extended state.

12. The method of claim 8, and connecting the USB connector in the extended state to a data source for synching data between the mobile device and the data source.

13. A case for a mobile device that is powered by an internal rechargeable battery that is operatively connected to a power/data port on the mobile device, the case comprising:
   a plurality of walls bounding a cavity for receiving the mobile device in a mounted position, one of the walls being a rear wall;
   a cover wall juxtaposed with the rear wall and bounding an internal compartment therewith, the cover wall having an opening;
   a power/data connector fixed to the case and connected to the power/data port in the mounted position;
   an elongated Universal Serial Bus (USB) cable having one end inside the internal compartment, and an opposite end operatively connected to a USB connector; and
   a cable extension/retraction mechanism mounted in the internal compartment and operatively connected between said one end of the USB cable and the power/data connector, the mechanism being operative for enabling the USB cable to be extended in one direction through the opening to an extended state for connection of the USB connector to an electrical power source for recharging the internal rechargeable battery and for connection of the USB connector to a data source for synching data between the mobile device and the data source, and for enabling the USB cable to be retracted in an opposite direction through the opening to a retracted state for storage inside the internal compartment.

* * * * *